United States Patent [19]

Gatewood

[11] 4,401,201

[45] Aug. 30, 1983

[54] CLUTCH DRIVEN PLATE ASSEMBLY

[75] Inventor: Sidney U. Gatewood, Roseville, Mich.

[73] Assignee: Borg-Warner Corporation, Chicago, Ill.

[21] Appl. No.: 219,271

[22] Filed: Dec. 22, 1980

[51] Int. Cl.³ .............................................. F16D 3/14
[52] U.S. Cl. .................................. 192/106.2; 464/64; 464/68
[58] Field of Search ........................ 192/106.2, 106.1; 464/64, 68, 66

[56] References Cited

U.S. PATENT DOCUMENTS

| | | | |
|---|---|---|---|
| 2,574,573 | 11/1951 | Libby | 464/68 |
| 3,091,949 | 6/1963 | Sink | 464/68 |
| 3,101,600 | 8/1963 | Stromberg | 464/68 |
| 3,974,903 | 8/1976 | deGennes | 192/106.2 |
| 4,122,931 | 10/1978 | Maucher | 192/106.2 |
| 4,139,995 | 2/1979 | Lamarche | 192/106.2 X |
| 4,144,959 | 3/1979 | Maucher et al. | 192/106.2 |
| 4,188,805 | 2/1980 | Fall et al. | 192/106.2 X |
| 4,188,806 | 2/1980 | Fall et al. | 192/106.2 X |
| 4,232,534 | 11/1980 | Lamarche | 192/106.2 X |
| 4,304,107 | 12/1981 | Fall et al. | 192/106.1 X |

*Primary Examiner*—Rodney H. Bonck
*Attorney, Agent, or Firm*—James A. Geppert

[57] ABSTRACT

A clutch driven plate assembly for use in a vehicle or industrial application utilizing a torsional damping system with a high deflectional amplitude to connect the driving and driven members. The assembly includes a hub having oppositely disposed radially extending arms, a substantially central driven plate carrying the friction linings, and a pair of axially spaced spring retainers with openings receiving a series of helical springs. The driven plate has a pair of oppositely disposed elongated openings encompassing and abutting an adjacent pair of springs, and the hub arms receive the adjacent pair of springs therebetween and are in driving contact therewith.

7 Claims, 14 Drawing Figures

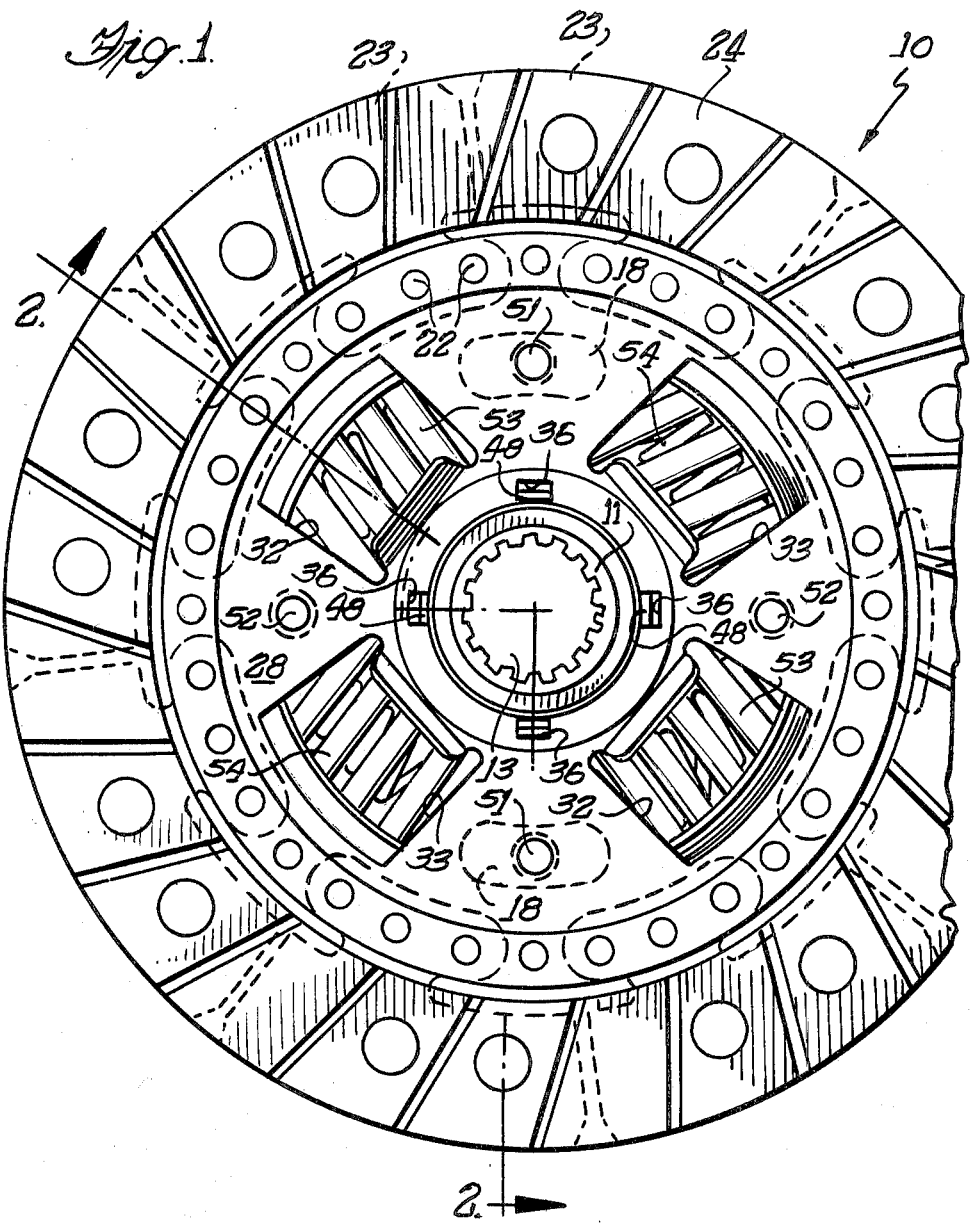

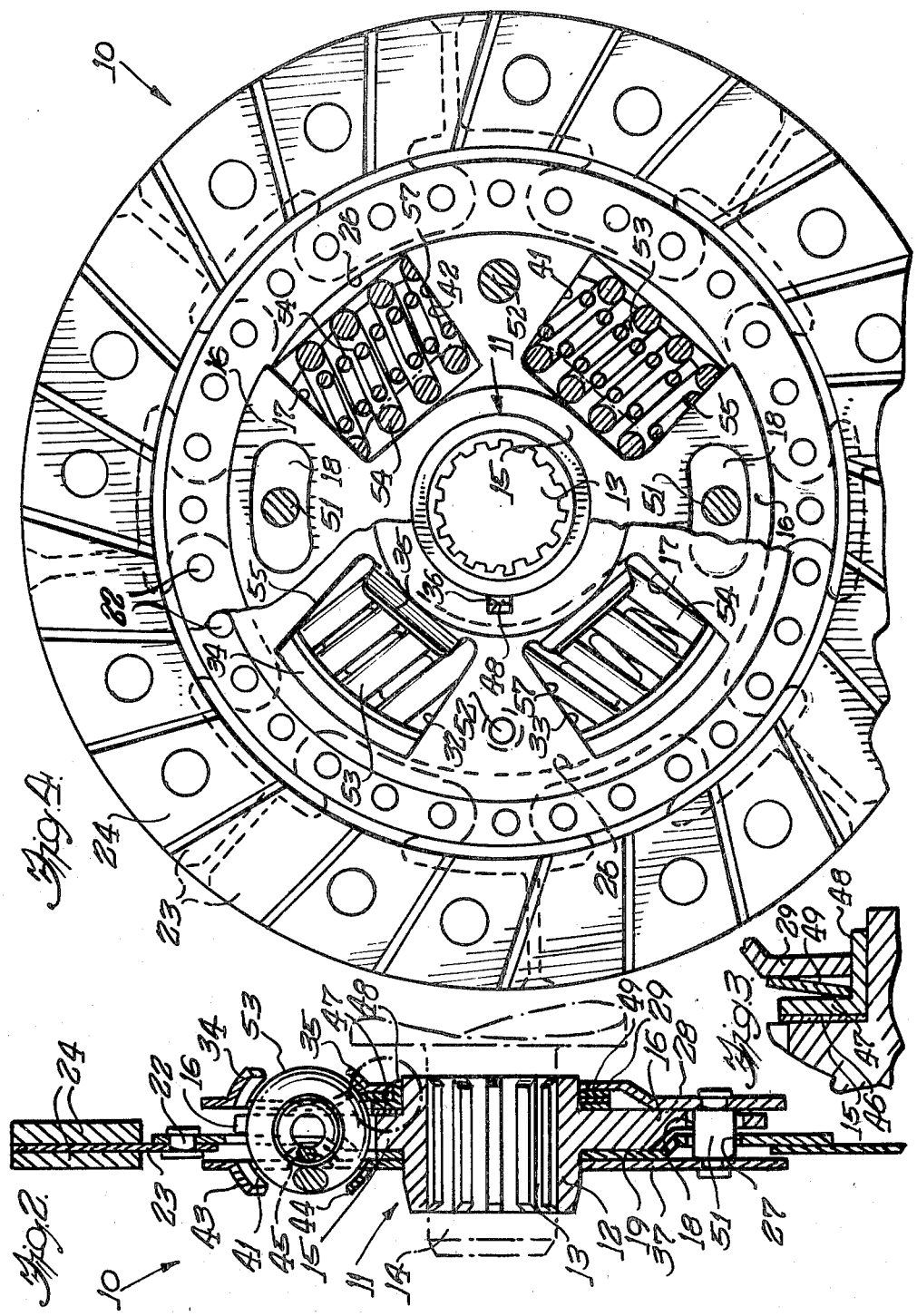

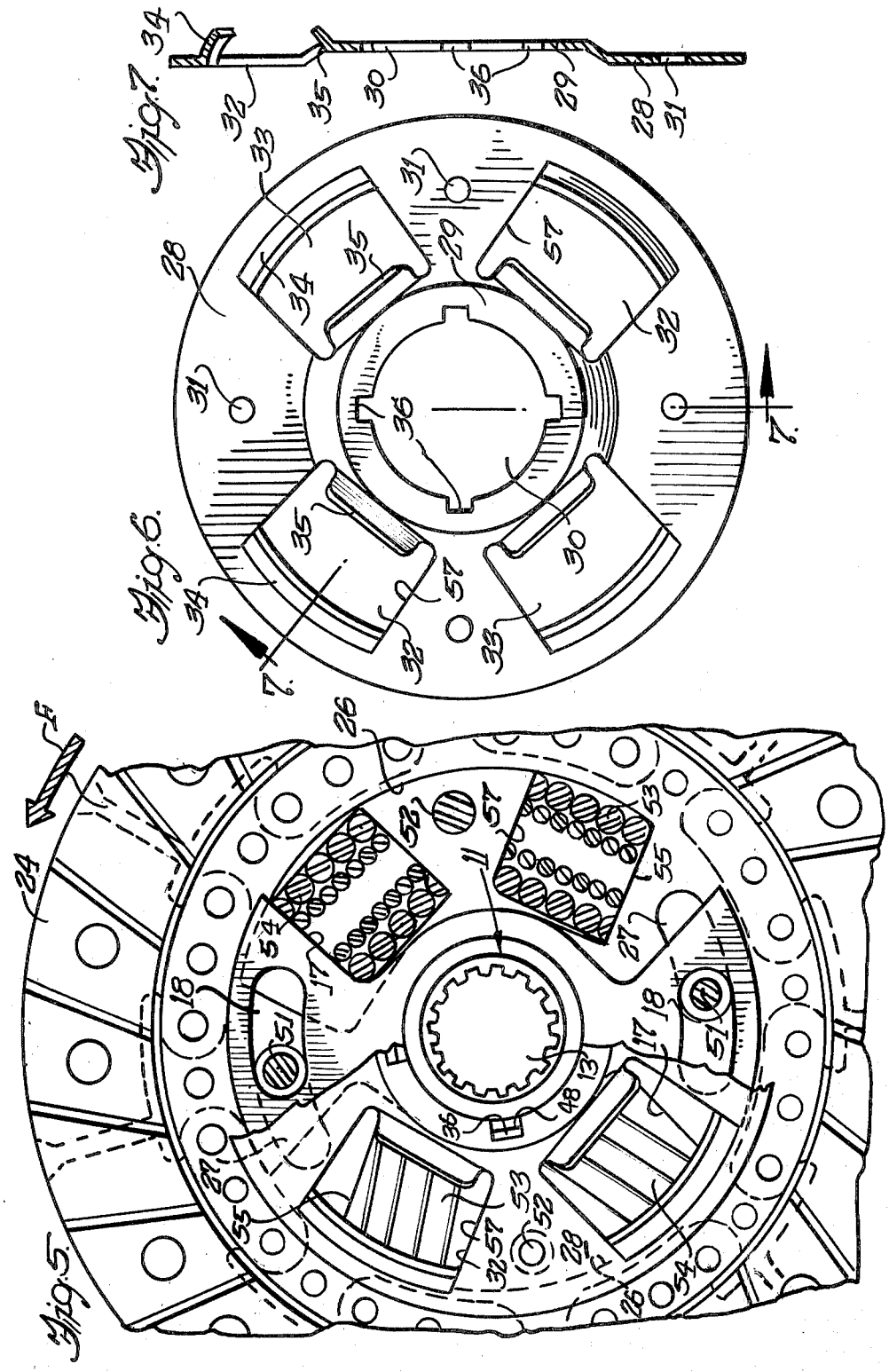

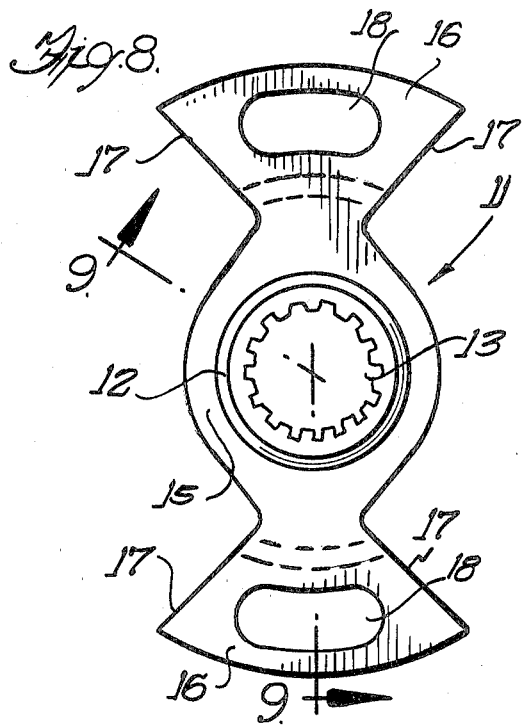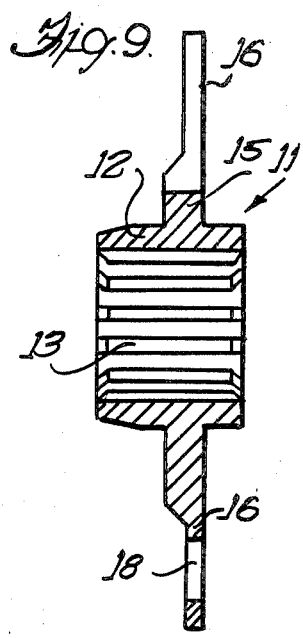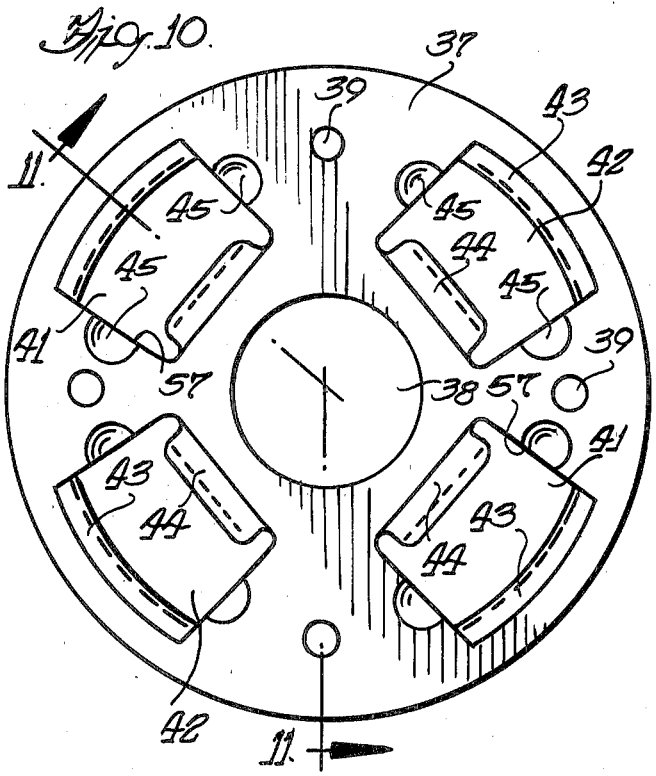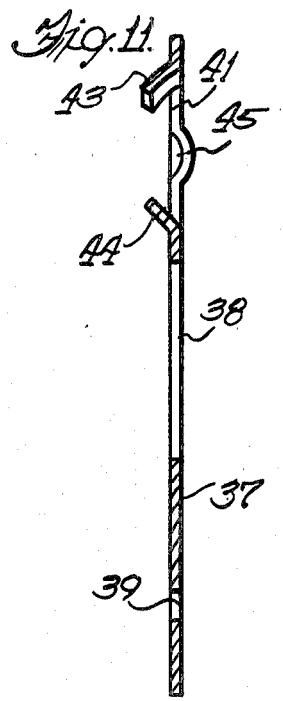

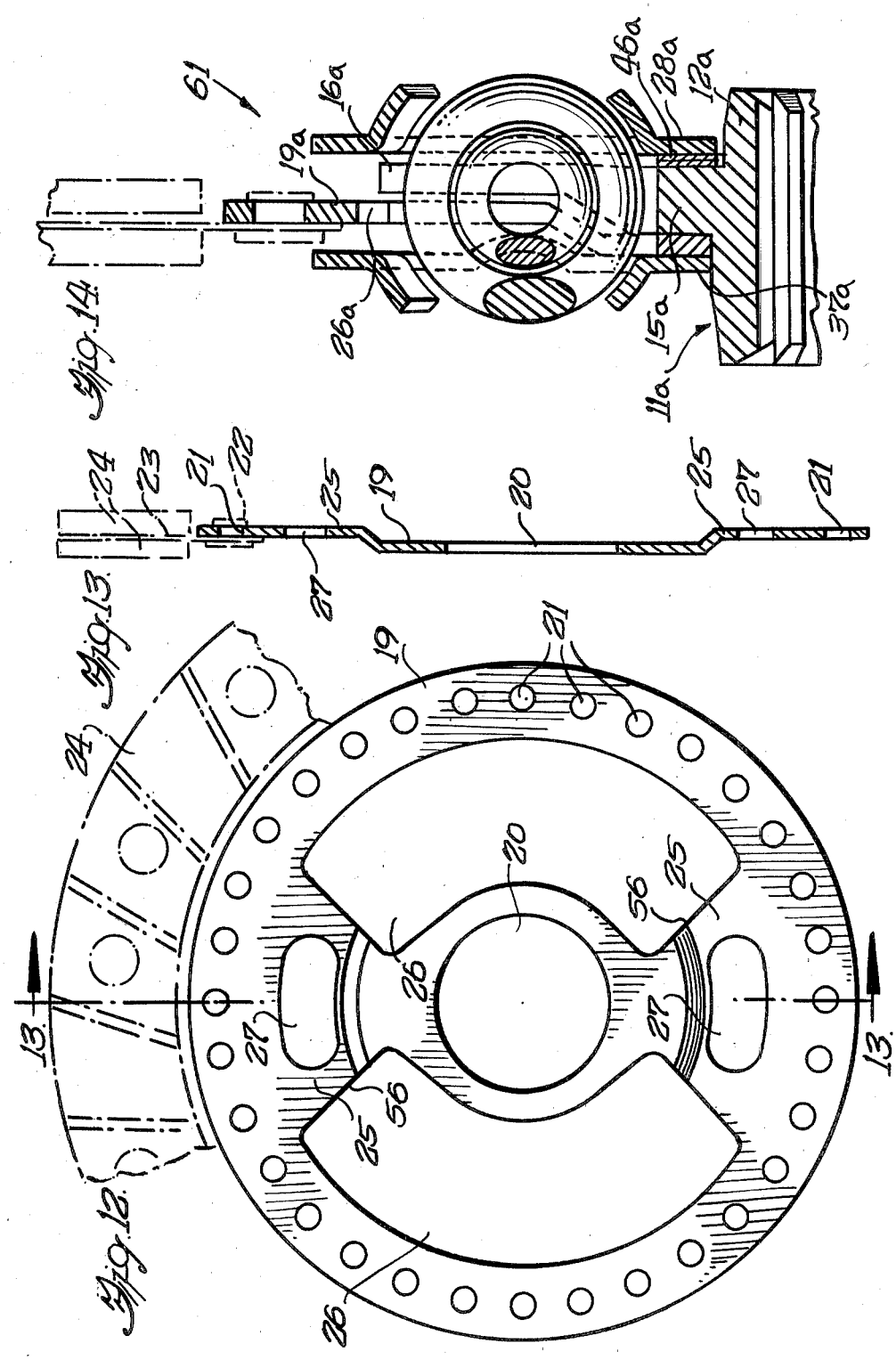

CLUTCH DRIVEN PLATE ASSEMBLY

BACKGROUND OF THE INVENTION

The use of torsional vibration dampers in power transmitting elements, such as vehicle clutches, is widespread throughout the automotive industry. A conventional construction involves a plurality of circumferentially spaced compression springs acting between the friction disc driving member and the clutch hub driven member. The compression springs both act as the driving connection while providing damping of the transmission gears from vibration and chatter.

In designing a damper for a clutch plate assembly, size limitations control the maximum torque and travel that can be provided. Considerations of damper spring outside diameter, installed length, compressed length, solid length and stress, in combination with the size of the spring windows in the retainer plate, hub and driven plate, to retain and/or provide the required spring compression are necessary. In dampers of the type generally in use today, spacer or stop pins are normally used to attach a drive plate to a retainer plate. The length of the required spring windows determine the amount of space remaining in which to add slots around the spacer pins, which in turn determines the available amplitude for the damper. Current dampers, with equal travel in drive and coast directions, normally have springs which are circumferentially equally spaced.

U.S. Pat. No. 3,091,949 discloses a clutch plate having a design which may provide an amplitude that is approximately double that of a current type damper. However, if no spring change is made in this patent, the resultant damper capacity will be reduced by 50% since two pairs of springs will be operating in series. Since the spring load must be doubled to maintain damper capacity, and assuming that the springs are working at the maximum load, solid length and stress, it becomes necessary to make spring changes, such as increasing outside diameter, installed length, solid length, etc., to provide the requisite spring load with a safe stress. An increase in installed spring length, therefore, results in a reduction in circumferential space required for a slot to accept the stop pins, which has previously been a problem when attempting to increase damper amplitude.

SUMMARY OF THE INVENTION

The present invention relates to a clutch driven plate assembly providing a high deflectional amplitude with minimal friction scrub of the damper springs on the mating components. The damper springs are circumferentially unequally spaced in an assembly utilizing a pair of axially spaced spring retainer plates having a hub and a clutch drive plate interposed therebetween. The spring retainer plates have windows to receive a series of helical springs; the hub receiving the transmission input shaft has oppositely disposed radially extending arms in driving contact with the springs; and the clutch plate is substantially centrally positioned with openings encompassing and abutting an adjacent pair of springs.

The present invention also comprehends the provision of a novel clutch plate assembly wherein, with two axially-spaced spring retainer plates having the clutch plate and hub therebetween, the web section between an adjacent pair of springs openings in the hub and clutch plate is completely removed, thereby permitting unequal spacings in the spring pairs. Thus, the larger web sections of the hub and drive plate permit the use of identical and longer slots at the stop pin area with a resultant increase in deflection amplitude. This design is based on the springs working at their solid height so that the stop pins do not come in contact with the hub or drive plate.

The present invention further comprehends the provision of a novel clutch plate assembly providing a damper having a high amplitude utilizing helical compression springs in series, but not individually retained within the same reaction member. However, by using the two axially spaced spring retainer plates with the springs individually retained within the same reaction member, each spring of an adjacent pair will compress only one half of the combined deflection. Therefore, the resultant frictional scrub will be greatly reduced.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view of a clutch plate assembly embodying the present invention.

FIG. 2 is a cross sectional view of the clutc plate assembly taken on the irregular line 2—2 of FIG. 1.

FIG. 3 is an enlarged partial cross sectional view showing details encompassed by the dotted circle in FIG. 2.

FIG. 4 is a rear elevational view similar to FIG. 1, but having portions of the various plates broken away.

FIG. 5 is a partial rear elevational view similar to FIG. 4, but showing the position of the parts with drive torque applied.

FIG. 6 is a rear elevational view of the rear spring retainer plate of the assembly.

FIG. 7 is a cross sectional view taken on the irregular line 7—7 of FIG. 6.

FIG. 8 is a rear elevational view of the clutch hub.

FIG. 9 is a cross sectional view taken on the irregular line 9—9 of FIG. 8.

FIG. 10 is a rear elevational view of the front spring retainer plate.

FIG. 11 is a cross sectional view taken on the irregular line 11—11 of FIG. 10.

FIG. 12 is a rear elevational view of the clutch driven plate with a portion of the friction facings shown in dotted outline.

FIG. 13 is a vertical cross sectional view taken on the line 13—13 of FIG. 12.

FIG. 14 is an enlarged partial cross sectional view of an alternate embodiment of clutch plate assembly.

DESCRIPTION OF THE PREFERRED EMBODIMENTS

Referring more particularly to the disclosure in the drawings wherein are shown illustrative embodiments of the present invention, FIGS. 1-13 disclose a clutch plate assembly 10 for a vehicle clutch assembly adapted to be interposed between a flywheel driven by a motor and a pressure plate rotating therewith. The clutch assembly includes a hub 11 (FIGS. 8 and 9) having a generally cylindrical barrel 12 with an internally splined passage 13 therethrough to receive the splined end of the transmission input shaft 14 (FIG. 2). An integral radial flange 15 is generally centrally located on the barrel with opposed portions of the flange web omitted to form a pair of oppositely disposed hub arms 16,16, each having outwardly diverging edges 17,17 and a centrally positioned elongated arcuate slot 18 adjacent the periphery of the arm.

A clutch driven plate 19 (FIGS. 12 and 13) has a central opening 20 receiving the hub barrel 12 to rotate thereon and a plurality of openings 21 adjacent the periphery to receive rivets 22 fastening cushioning plates or springs 23 around the circumference thereof; the plates 23 carrying opposed annular friction facings 24,24 which are suitably secured to the opposite surfaces thereof by rivets or adhesive. Web portions of the plate 19 have been removed resulting in a pair of oppositely disposed web portions 25,25 separating elongated arcuate windows 26,26. An elongated arcuate slot 27 is centrally located in each web portion 25 to normally be in substantial axial alignment with the slots 18 in the hub arms 16.

Also journalled on the hub barrel are a pair of axially spaced spring retainer plates 28 and 37. The rear plate 28 (FIGS. 6 and 7) has a central offset portion 29 with a central opening 30 receiving the hub barrel 12, four circumferentially equally spaced openings 31 adjacent the periphery and four spring windows 32,32,33,33. The windows are unequally spaced in the plate with the right hand pair 32,33 and the left hand pair 32,33, as seen in FIG. 6, more closely positioned than the spacing between the windows at the top and bottom of the plate. Each window has radially outwardly and inwardly located opposed lips 34,35, respectively, which are inclined rearwardly from the plate. Also, the central opening 30 has four equally spaced notches 36 formed in the periphery thereof for a purpose to be later described.

The front retainer plate 37 (FIGS. 10 and 11) is generally flat with a central opening 38 receiving the hub barrel, four equally spaced openings 39 axially aligned with the openings 31 in retainer plate 28, and four unequally spaced windows 41,41,42,42 axially aligned with windows 32,32,33,33 in plate 28; each window having a radially outer lip 43 and an inner lip 44 inclined forwardly of the plate. A semi-circular depression 45 is formed at each end of each window 41 or 42.

Now considering the assembly as shown in FIGS. 1 through 4, the clutch driven plate 19 and front retainer plate 37 are positioned on the forward end of the hub barrel 12, while the rear retainer plate 28 is positioned on the rear end of the barrel. Interposed between the hub flange 15 and the rear retainer plate 28 are one or more shims 46, a friction plate 47 and a cupped spring 49 nested in the plate offset 29 (FIG. 3). The friction plate 47 has four equally spaced inner axially extending tabs 48 which are received in the notches 36 of the plate 28.

Two stop pins or rivets 51 extend through the aligned pairs of elongated slots 18 and 27 in the hub arms 16 and driven plate 19 to be received in the axially aligned openings 31 and 39 of the plates 28 and 37 and secured thereto, while another pair of stop pins or rivets 52 are secured in the opposite pairs of openings 31 and 39 and extend through the slots 26,26 of the plate 19 and the space between the hub arms 16. Also, spring packs 53 and 54 are located in the aligned windows 32,41 and 33,42, respectively, as well as in the arcuate slots 26 of driven plate 19 and in the spaces between the hub arms 16.

The assembly is shown in FIGS. 1 and 4 in its normal rest position without applied torque. Assuming that the hub 11 is held rigidly to prevent rotation, counterclockwise movement of driven plate 19 in the direction of arrow F in FIG. 5 exerts a load to surface 55 of each spring pack 53 by the edge 56 of the plate web 25 until the springs so solid, and the load is transferred through spring pack 53 to surfaces 57 of retainer plates 28 and 37. As the retainer plates are free to rotate on the hub, load is simultaneously transferred to spring pack 54 until these springs go solid as movement of spring pack 54 is resisted at surface 17 of the hub arm. Therefore, spring packs 53,54 operate in series until total damper deflection is achieved, at which time the spring packs are at their solid height with no restriction of travel at stop pins 51 and slots 18 and 27 in the hub arms 16 and driven plate 19, respectively. When the springs 53,54 are solid, the spring ends and the surfaces 56,57 of the adjacent load sources will be parallel.

If all spring packs are identical, a torque vs. deflection curve will result in a straight line curve. Variations in torque curves can be achieved by providing combinations of light and heavy spring packs at alternate spring locations. Also, the unequal spacing of the spring packs provide larger web sections for the hub arms and drive plate, which in turn permits the use of identical and longer slots in the hub and drive plate at the stop pin area to provide an increase in deflectional amplitude. As the spring packs are working at their solid heights, the stop pins do not have to come into contact with the hub or drive plate. Since the springs operate in series, the drive plate and facing unit will travel twice the distance of travel of the retainer plates.

FIG. 14 discloses an alternate embodiment 61 of clutch plate assembly wherein like parts will have the same reference numeral with a script a. In this assembly, the hub 11a includes a barrel 12a and flange 15a with hub arms 16a oppositely disposed thereon. The drive plate 19a is journalled on the hub barrel 11a and has elongated openings 26a to receive the adjacent spring packs. The rear retainer plate 28a is substantially flat, without an offset, and shims 46a are located between the plate 28a and the hub flange 15a. The front retainer plate 37a is journalled on the opposite side of the hub flange. This assembly operates in the same manner except the shims 46a provide the requisite friction drag without the necessity of the friction plate and cup spring.

I claim:

1. In a clutch plate assembly comprising a hub having a radial flange, a clutch driven plate carrying oppositely disposed friction facings, a pair of spring retainer plates axially spaced apart and encompassing said hub flange and clutch driven plate therebetween, said spring retainer plates having a plurality of axially aligned spring windows therein, and damper springs received in each aligned set of windows, the improvement comprising that said damper springs and windows are unequally spaced about the circumference of said plates, a pair of oppositely disposed radially extending hub arms located between pairs of adjacent damper springs, and said clutch driven plate having a pair of oppositely disposed elongated arcuate windows encompassing said pairs of damper springs.

2. A clutch plate assembly as set forth in claim 1, in which a plurality of stop pins are secured in the axially spaced spring retainer plates, said clutch driven plate and hub arms having a pair of elongated arcuate slots therein receiving a pair of stop pins, and another pair of stop pins extending through the spacing between the hub arms and the arcuate elongated windows in the clutch plate.

3. A clutch plate assembly as set forth in claim 1, wherein said adjacent pairs of damper springs encompassed by the elongated arcuate windows in said clutch driven plate act in series when torque is applied to the clutch driven plate.

4. A clutch plate assembly as set forth in claim 1, in which four sets of damper springs are received in four axially aligned sets of spring windows with opposite pairs of spring windows being more closely spaced together and the outer ends of each pair of spring windows spaced farther apart to provide said unequal spacing, and the web portions between said elongated arcuate windows of said clutch driven plate and said hub arms are axially aligned and located in said farther spacing between the pairs of springs.

5. A clutch plate assembly as set forth in claim 4, wherein the pair of oppositely disposed elongated arcuate windows each encompasses a pair of closely spaced adjacent springs.

6. A clutch plate assembly as set forth in claim 5, in which four circumferentially equally spaced stop pins are secured to the spring retainer plates at locations between said damper springs, said web portions of the clutch driven plate and said hub arms having a pair of oppositely disposed axially aligned elongated arcuate slots receiving one pair of stop pins, the other pair of stop pins extending through the space between the hub arms and the elongated arcuate windows in the clutch driven plate.

7. A clutch plate assembly as set forth in claim 6, wherein said opposite pairs of damper springs encompassed by the elongated arcuate windows in the clutch driven plate act in series through the spring retainer plates when torque is applied to the clutch driven plate.

* * * * *